(12) United States Patent
Rizzi

(10) Patent No.: US 10,155,211 B2
(45) Date of Patent: Dec. 18, 2018

(54) METHOD FOR REALIZING INTERNAL WALLS OF CATALYTIC REACTORS

(71) Applicant: Casale SA, Lugano (CH)

(72) Inventor: Enrico Rizzi, Casnate con Bernate (IT)

(73) Assignee: Casale SA, Lugano (CH)

( * ) Notice: Subject to any disclaimer, the term of this patent is extended or adjusted under 35 U.S.C. 154(b) by 19 days.

(21) Appl. No.: 15/539,353

(22) PCT Filed: Nov. 25, 2015

(86) PCT No.: PCT/EP2015/077599
§ 371 (c)(1),
(2) Date: Jun. 23, 2017

(87) PCT Pub. No.: WO2016/102135
PCT Pub. Date: Jun. 30, 2016

(65) Prior Publication Data
US 2018/0326382 A1    Nov. 15, 2018

(30) Foreign Application Priority Data

Dec. 23, 2014 (EP) .................................... 14199991

(51) Int. Cl.
*B01J 8/02* (2006.01)
*B01J 8/00* (2006.01)
*B01J 19/02* (2006.01)

(52) U.S. Cl.
CPC ............. *B01J 8/0214* (2013.01); *B01J 8/008* (2013.01); *B01J 19/02* (2013.01); *B01J 2208/027* (2013.01); *B01J 2219/0002* (2013.01); *B01J 2219/0277* (2013.01)

(58) Field of Classification Search
CPC .... B01J 8/0214; B01J 8/008; B01J 2208/027; B01J 19/02; B01J 2219/0002; B01J 2219/0277
See application file for complete search history.

(56) References Cited

U.S. PATENT DOCUMENTS 2,886,517 A * 5/1959 Patton .................... B01J 8/0214
208/134
4,971,771 A    11/1990 Stahl

FOREIGN PATENT DOCUMENTS

| EP | 0 265 654 A1 | 5/1988 |
|---|---|---|
| EP | 0 365 929 A2 | 5/1990 |
| EP | 1 818 094 A1 | 8/2007 |
| WO | 01/23080 A1 | 4/2001 |
| WO | 2013/053890 A1 | 4/2013 |

OTHER PUBLICATIONS

International Search Report issued in connection with PCT/EP2015/077599.
International Preliminary Report on Patentability issued in connection with PCT/EP2015/077599.

* cited by examiner

*Primary Examiner* — Lessanework Seifu
(74) *Attorney, Agent, or Firm* — Akerman LLP

(57) ABSTRACT

Reactor (1) for catalytic chemical reactions, comprising: a partially open outer vessel (2) comprising a manhole (6) for accessing to the interior, and at least one internal wall (5) comprising a plurality of panels (5.1, 5.2, . . . 5.*n*) assembled inside the vessel (2) so as to form said wall (5); the panels are flexible and deformable so that they may be inserted through said manhole (6), and the resulting wall (5) is not self-supporting and rests against a load-bearing wall (7) of the reactor.

9 Claims, 4 Drawing Sheets

METHOD FOR REALIZING INTERNAL WALLS OF CATALYTIC REACTORS

This application is a national phase of PCT/EP2015/077599, filed Nov. 25, 2015, and claims priority to EP 14199991.2, filed Dec. 23, 2014, the entire contents of both of which are hereby incorporated by reference.

FIELD OF APPLICATION

The invention relates to a method for realizing internal walls of catalytic reactors, in particular for realizing the outer collector of radial or axial-radial flow catalytic reactors.

PRIOR ART

In the field of catalytic chemical reactors there is the need to prepare walls inside the reactor vessel. Typically, these walls have the function of retaining the catalyst and conveying the flow of reagent gases. Among others, catalytic shift reactors, reactors for the synthesis of methanol and reactors for the ammonia synthesis are provided with internal walls called collectors.

Radial or axial-radial flow catalytic reactors, for example, comprise a catalyst bed delimited by an internal wall (inner collector) and by an external wall (outer collector), which are perforated and gas-permeable. The outer collector is respectively the inlet or outlet collector of the catalyst bed depending on the radial flow directed inwards or outwards.

The realization of these walls inside a vessel poses a number of technological challenges, in particular for the partially open reactors, which are the majority. The term "partially open reactor" denotes a reactor having no flange with the same or substantially the same diameter as the vessel, and in which the inside can only be accessed through an opening (manhole) with a significantly smaller diameter. The partially open design is preferred because large-diameter flanges are costly and are a potential cause of leakage; however, the access inside the reactor is obviously conditioned by the relatively small diameter of the manhole.

Consequently, an inner wall so large that it cannot be introduced through the manhole is assembled in sections. The single wall sections are introduced through the manhole and welded directly inside the vessel. For example, in radial flow reactors, the inner collector has a fairly small diameter and generally may be introduced through the manhole, but the outer collector, which has a diameter just slightly smaller than the vessel, must necessarily be realized in sections.

This technique has the drawback of a high cost during both manufacture and assembly on-site. The maximum size of the sections is determined by the need to introduce them through the manhole, and the surface area of each section in general is small if compared to the total surface area of the wall; therefore a large number of parts must be prepared and then welded together inside the vessel. The high costs arise from the number of parts required to form the internal wall and in particular the time required to perform long welds inside the vessel.

In the case of revamping of an existing apparatus, the need to reduce the assembly time assumes even greater importance since the time taken for revamping corresponds to loss of production due to plant shutdown, resulting in significant costs.

The construction of an internal wall may be further complicated by a manhole located in a poorly accessible position. For example a manhole situated in a lateral or inclined position with respect to the axis of the apparatus (which is generally vertical) makes the introduction of the sections more difficult, thus resulting in the need to manufacture them with a smaller size, and increases the aforementioned costs. A lateral manhole is typically found in LTS (low temperature shift) reactors which are situated underneath a HTS (high temperature shift) reactor. As a result of this location, the top part of the LTS reactor is occupied by the gas inlet tube and the manhole is located on the lateral surface.

The construction of the outer collector of radial flow reactors is particularly complicated because of both the large dimensions of the collector, which has a diameter similar to the diameter of the reactor itself, and the fact that, in many cases, said outer collector has a load-bearing function.

EP 1818094 describes inner and outer collectors made with a double wall. This constructional design has a number of recognized advantages from a functional point of view; however, for the reasons explained above, it may have high costs.

In order to reduce the assembly time, a so-called "scallops" constructional design has been adopted. This design envisages an outer collector which, instead of being a single-piece cylinder, is formed with a series of double-wall, perforated sheet-metal elements, situated longitudinal and parallel to the reactor axis, known as "scallops" and resting on the inner wall of a catalyst cartridge. The scallops are spaced from each other by a play which increases or decreases following the heat expansion occurring during operation.

The scallops design has the advantage of not requiring longitudinal welds and ensures installation and assembly times shorter than those of cylindrical collectors. This design, however, poses a number of problems: the scallops do not surround the entire catalyst mass (but are immersed inside it) and the presence of the aforementioned play results in the catalyst coming into contact with the internal wall of the cartridge. This results in the formation of catalyst zones which are not cooled, with the possible formation of hot spots and generation of by-products, and local heating of the cartridge. Moreover, the scallops design results in high costs due to the large number of parts required to form the outer collector and due to the double-wall configuration. For these reasons, the solution of the scallops design is not entirely satisfactory.

SUMMARY OF THE INVENTION

The invention aims to simplify the construction of internal walls of partially open catalytic reactors, with particular reference to the realization of the outer collector of radial or axial-radial flow catalytic reactors. In greater detail, the invention aims to reduce the number of parts required to realize said walls and to reduce the labour costs associated with execution of the respective welds.

This object is achieved with a reactor for catalytic chemical reactions comprising: a partially open outer vessel comprising a manhole for the access to the interior, inlet and outlet openings for entry and exit of reagents and reaction products, respectively, and at least one internal wall, characterized in that:
said at least one wall comprises a plurality of panels, which are assembled inside the vessel to form the said wall, the panels being flexible and deformable so as to allow their insertion through said manhole and/or through at least one of said inlet and outlet openings, and the resultant wall being non self-supporting and resting on a load-bearing wall of the reactor.

The term "partially open outer vessel" is understood as meaning that the vessel has no full-diameter openings, i.e. it does not comprise openings with the same or substantially the same diameter as the vessel. Hence, the only openings and flanges of the vessel (e.g. manholes) are significantly smaller than the diameter.

The term "non self-supporting wall" is understood as meaning that the internal wall is not designed to bear the stress of the normal operating conditions in the reactor, the load-bearing function being performed by a reactor wall.

A preferred application of the invention consists in the construction of an outer collector of a catalyst bed with radial or axial-radial through-flow. The outer collector is a cylindrical or polygonal wall which is arranged around the catalyst bed and is designed to convey or collect (depending on the inward or outward direction) a gaseous flow of reagents into or from the bed itself. The reactor comprises a catalyst cartridge containing the bed and constituting an external load-bearing wall; said internal non self-supporting wall forms the outer collector of the bed; said collector is of the single-wall type and rests against said load-bearing wall of the catalyst cartridge.

The non self-supporting collector, according to the invention, is not designed to withstand the stresses resulting from the thrust of the catalyst due to the intrinsic weight of the catalyst and the load loss exerted by the gas (when passing through the collector and the catalyst mass) and the expansion differences between the catalyst and the collector itself. These stresses, according to the invention, are transmitted to the collector, but are withstood by the load-bearing wall of the catalyst cartridge, owing to the bearing contact of the collector against said wall.

Compared to the aforementioned scallops design, the non self-supporting collector according to the invention offers numerous advantages, including: surrounding of the entire catalyst mass and no play between two adjacent panels (which avoid contact between the catalyst and the cartridge), and moreover they are formed by single walls, which are less costly.

Owing to the proposed geometrical configuration, the distance between two successive panels may be advantageously reduced as required, thus making possible, over the prior art, a considerable reduction in the thickness of the collectors, while remaining within the permissible limits concerning the mechanical strength requirements. This provides the aforementioned panels with the necessary flexibility such that they can be deformed and inserted through the manhole. The panels which form the internal wall may therefore be made of steel sheet with a small thickness, for example a thickness of not more than 1 mm, thus being flexible.

A major advantage of the invention, consequently, is that the single panels may have dimensions greater than the manhole available, since they can be bended for introduction owing to their flexibility. For example, the panels may be rolled up using suitable tools known per se (for example strapping tools as commonly used for industrial packing), until they can enter the available manhole. Furthermore, the panels may be rolled up and fastened, reducing their overall volume and the delivery costs, this being an important advantage in particular for revamping operations.

Owing to their elastic deformability (made possible by their small thickness), the panels follow the curvature of the cartridge wall. Moreover, since they do not carry out the load-bearing function, the joints between the panels may also be executed in a simple and cheap manner. Fixing together of the panels may be performed for example using bolts or known mechanical securing means. Removable connections may be provided between the panels, with the advantage of simplifying inspection, repair or replacement operations.

Another advantage of the elasticity of the panels consists in their capacity to compensate for expansion differences. Therefore the constructional design of the internal wall according to the invention easily withstands the thermal stress.

The reduced thickness also allows performing drilling and slotting operations necessary for the gas flow, by means of punching. It is known that punching is the most cost-effective perforation process, but can only be used when the size of the holes is approximately equal to (or greater than) the thickness of the metal sheet. On the other hand, containment of the catalyst requires fairly small holes and, therefore, punching generally cannot be performed in the prior art, where the collector has relatively thick walls and the minimum size of the holes which can be formed by punching would be too large. Thanks to the invention the collector has a small thickness and may be perforated by punching, resulting in significant savings.

In a preferred embodiment, the panels have a surface area comprising crests or ribs which are directed parallel to the axis of the reactor and which define lines of bearing contact against the load-bearing wall of the catalyst cartridge. For example, the panels may be made using corrugated metal sheet, and more preferably using so-called fretted metal sheet. By applying the invention to the construction of the outer collector, the crests act as spacers between the outer collector and the load-bearing wall of the cartridge, and thus define an interspace (annular cavity) for the gas flow between said two parts.

The fretted, or ribbed, metal sheet is particularly advantageous owing to the fact that the distance between collector and wall, i.e. the cross-section of the interspace, may be determined freely by the depth of the ribs, and is substantially independent from the distance between adjacent ribs (pitch). In other words, when changing the depth of the ribs, the pitch of the ribs may be determined independently of the gas flow cross-section between collector and cartridge. This feature is advantageous if compared to the use of a corrugated metal sheet, where the size of the gas through-flow interspace depends substantially on the wavelength of the corrugated metal sheet.

More advantageously, section-breaker rings are also provided and are fixed to the panels of the outer collector at suitable intervals along the axial direction. The section-breaker rings prevent the risk of failure due to instability (compression) of the internal wall formed by the various panels.

In accordance with various embodiments of the invention, the panels may have permeable zones, provided with passages for the gas, and impermeable zones, i.e. without said passages. The gas passages are formed for example by holes or slots. Different portions of the surface of the panels may have a different distribution of the gas passages, for example holes with a different size and/or spacing.

The panels, according to a preferred embodiment, may be constructed from flat metal sheets using the following production cycle:

I. realization of the perforations, for example slots (slotted metal sheets) or holes by means of punching along given sections (this operation is not necessary if an already perforated metal sheet is used);

II. formation of holes for fixing the parts together and holes for the securing systems;

III. folding by means of a die-pressing or profiling tool along predetermined longitudinal lines;

IV. any welding for securing means, lock-nuts according to requirements;

V. rolling up and fastening, where required, for example for despatch or for assembly;

VI. installation by means of insertion of the panel and juxtaposition to the wall of the cartridge.

During the installation step, the panel may be kept rolled up by suitable straps. After removing (e.g. cutting) these straps, the panel is kept in position by means of a base ring which acts as a template and/or by the section-breaker rings.

The invention also relates to a method for realizing an internal wall of a reactor according to the accompanying claims.

According to the method of the invention, the wall is formed by a plurality of panels with a size greater than the manhole of the reactor, when they are in an undeformed condition. According to the method, each panel is deformed so that it may be introduced into the reactor through the available manhole; after they have been introduced into the reactor, the panels recover their original configuration and are assembled so as to rest against a load-bearing wall of the reactor, for example a wall of a catalyst cartridge. The deformation of the panels is elastic or partially elastic and partially plastic. After being introduced into the reactor, the panels recover their original configuration elastically or by means of application of a force which is in any case of a limited entity. The at least partially elastic deformation of the panels, which allows them to be introduced into the manhole, is made possible by their small thickness, which in turn is derived from the non self-supporting design, the load-bearing function being performed by a wall of the reactor itself.

The method according to the invention may also be used to revamp an existing reactor, for example by replacing a conventional collector with a collector realized in accordance with the invention.

The advantages of the invention will emerge even more clearly with the aid of the detailed description below, and relating to a number of preferred embodiments.

DETAILED DESCRIPTION OF A PREFERRED EMBODIMENT

Figure 1:
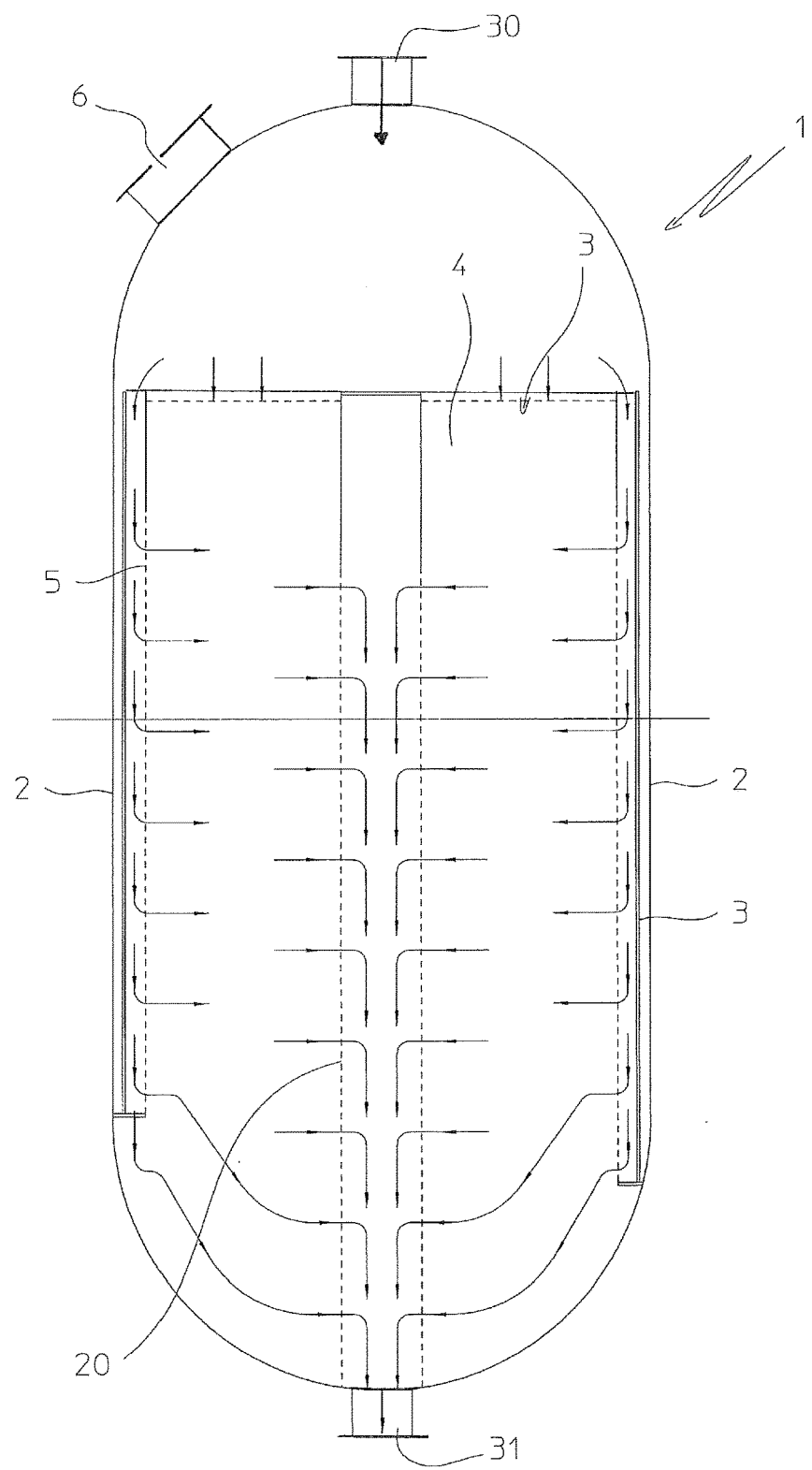
FIG. 1 shows a schematic cross-sectional view of a reactor according to an embodiment of the invention.

FIG. 1 shows a schematic illustration of a chemical reactor 1 with radial or axial-radial flow and centripetal (inward) flow, which essentially comprises: a partially open vessel 2, a catalyst cartridge 3 containing a catalyst bed 4 with the radial or axial-radial through-flow; an outer collector 5 arranged around the catalyst bed 4.

The partially open vessel 2 comprises a manhole 6 with a diameter smaller than the diameter of the vessel 2, a top inlet opening 30 and a bottom outlet opening 31 with a diameter smaller than the manhole 6.

The axial-radial through-flow of the bed 4 is achieved by means of the outer collector 5 and an inner collector 20.

The outer collector 5 rests against the cartridge 3 and has a modular design, being formed substantially by a plurality of panels which can be inserted through the manhole 6 and/or through the top opening 30.

It should be noted that the collector 5 is flexible along its transverse extension, but is rigid longitudinally. Consequently, should the axis of the manhole 6 not be vertical, it does not allow the insertion of long elements beyond the internal diameter of the apparatus, but smaller elements, which are as long as the apparatus, may be inserted through the top inlet opening 30.

Figure 2:
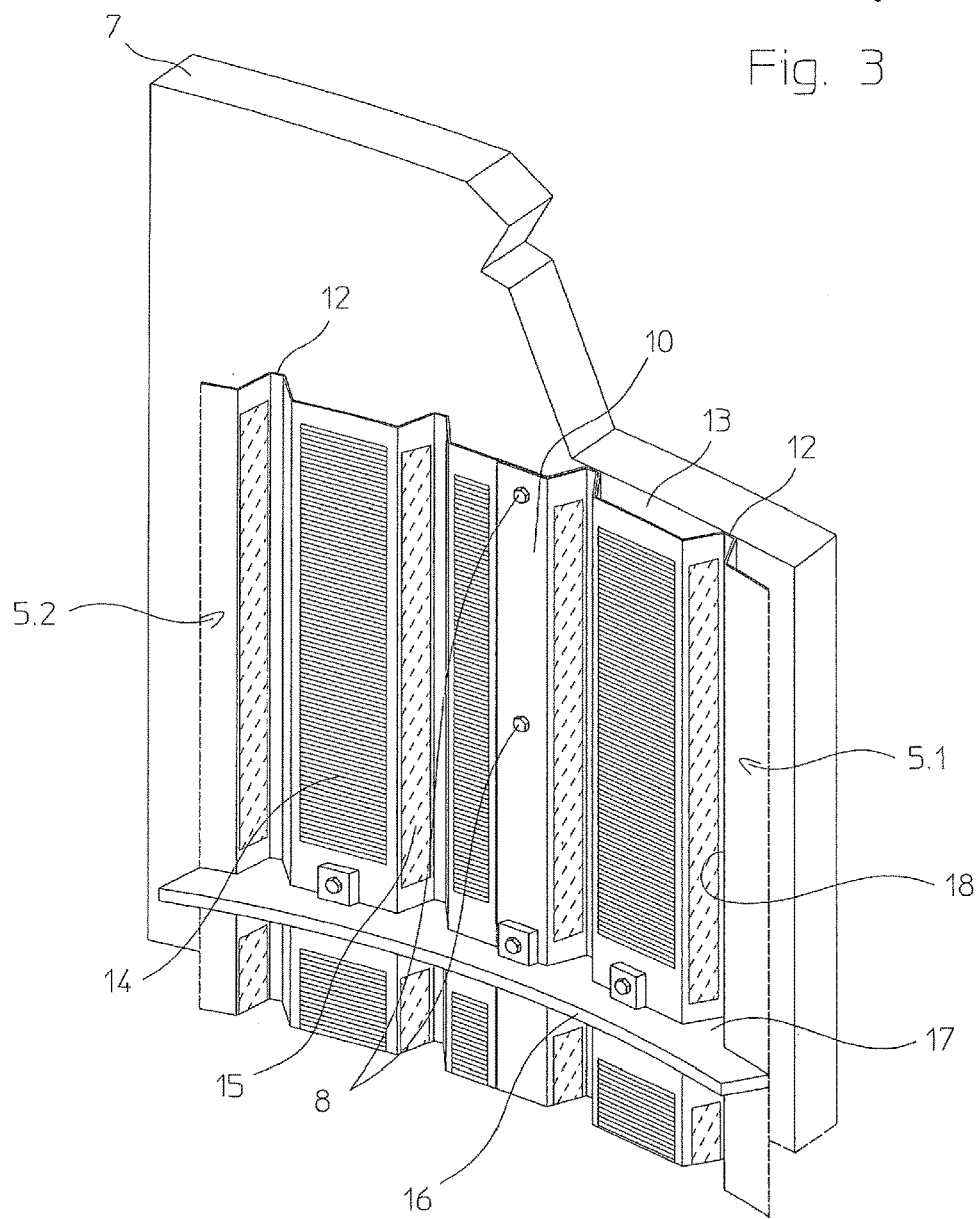
FIG. 2 shows the collector of the reactor according to FIG. 1, inside the vessel and resting against a wall of the catalyst cartridge of the reactor.

A preferred embodiment is shown in FIG. 2, which partially show two panels 5.1 and 5.2 forming part of the outer collector 5, resting against a load-bearing wall 7 of the catalyst cartridge 3. The panels forming the collector 5 in the example are made from a small-thickness, elastically flexible, fretted metal sheet and are joined together by longitudinal joints using bolts 8.

Figure 3:
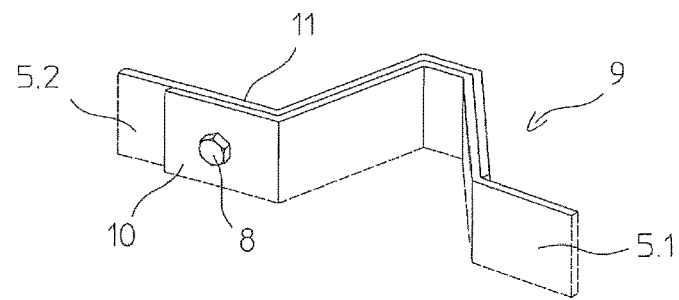
FIG. 3 shows a detail of the joint between two panels of the collector according to FIG. 2.

A preferred embodiment of the connection is shown in FIG. 3. There is a covering zone 9 between the panel 5.1 and the panel 5.2, and the end flange 10 of the panel 5.1 is bolted to the underlying flat portion 11 of the panel 5.2.

Figure 4:
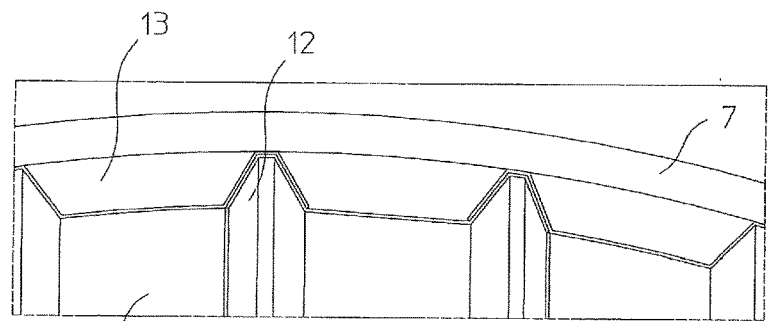
FIG. 4 shows a detail of FIG. 2 relating to the contact zone between collector and wall of the cartridge.

The panels comprise ribs 12 which rest and make contact against the wall 7 and space the collector 5 from said wall 7, defining a gas flow interspace 13, as also shown in the detail of FIG. 4.

The panels comprise gas passages, for example holes, which are distributed in a uniform or varied manner. For example, the panels comprise a first arrangement of gas passages on the flat surfaces 14 and a second arrangement of gas passages on the sides 15, the first and second arrangements being different in terms of shape and/or size and/or pitch of the gas passages. For example, the gas passages consist of holes or slots and the different arrangements of passages correspond to different holed arrangements. In the example shown in the figures, each panel has a flange 10 which is used for fixing (FIG. 2) and which has a continuous surface area without passages for the gas.

The figure also shows a section-breaker ring 16. Advantageously the section-breaker ring 16 comprises protuberances 17 matching with grooves 18 defined by the ribs 12. A plurality of section-breaker rings may be arranged at a suitable distance from each other, depending on the stressed state of the collector 5. Typically said distance is comprised between one and two meters.

Figure 5:
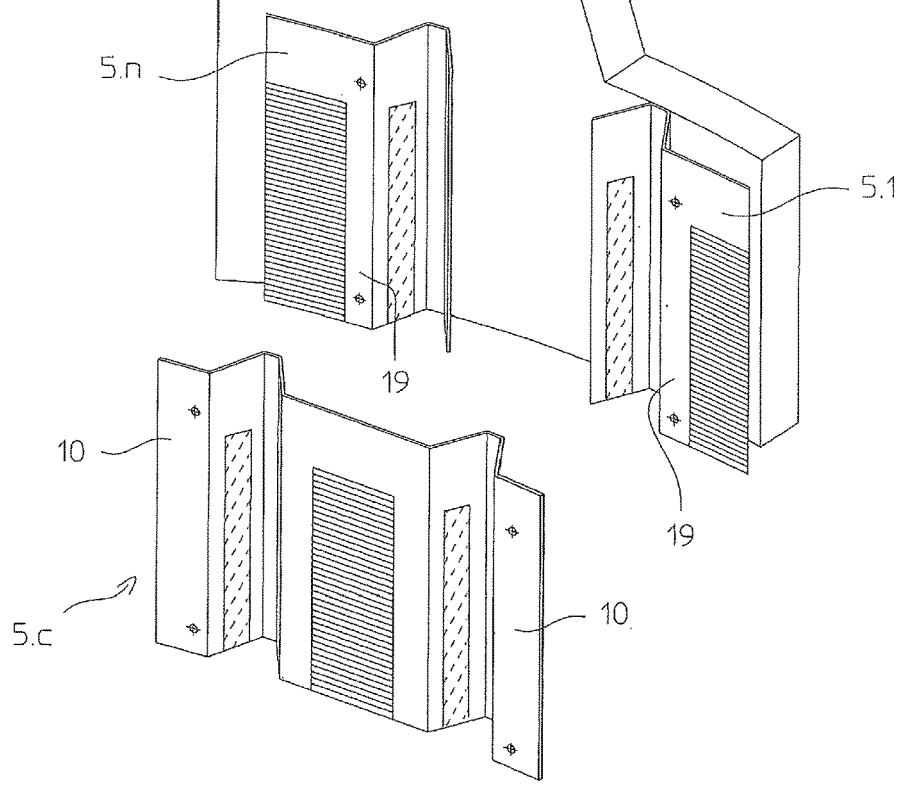
FIG. 5 shows a preferred mode of forming a closing joint of the collector.

FIG. 5 shows a preferred embodiment of a final closing joint of the collector. Two end panels 5.1 and 5.n are joined together by a terminal panel 5.c suitably shaped with two flanges 10 on opposite sides so that it may be bolted to both the end panels, in particular along a section 19 without holes.

Figure 6:
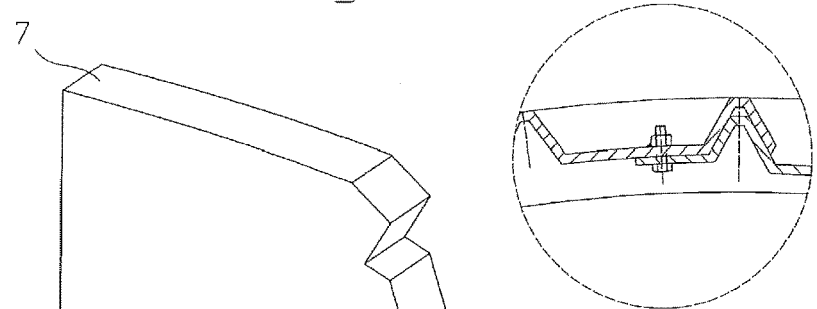
FIG. 6 shows a cross-sectional view of a joint between two panels of the collector.

The cross-section of a typical bolted joint between panels of the collector 5 is shown in FIG. 6.

Figure 7:
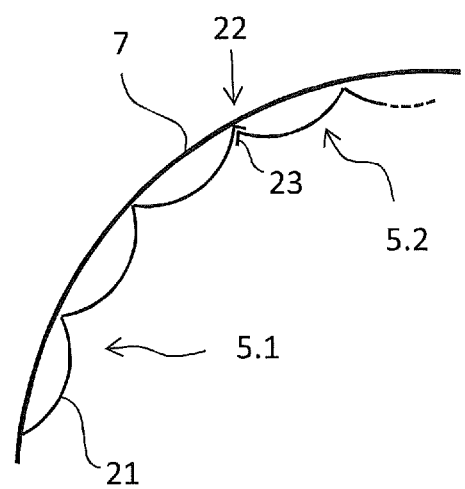
FIG. 7 illustrates another embodiment of the invention.

FIG. 7 show an embodiment where the panels 5.1, 5.2, . . . comprises arc-shaped portions 21. Preferably said portions 21 are circular arcs. Said portions 21 are interconnected by joints 22, made for example on V-shaped terminations 23 which partially overlap. An advantage of this embodiment is an even distribution of stress thanks to the circular shape of portions 21. As in the previous embodiments, the collector 5 has no solution of continuity and the vessel 7 is not exposed to the catalyst.

Advantageously, the panels 5.1, 5.2, ... 5.n have a small thickness, for example of not more than 1 mm, which makes them easily deformable. Owing to their deformability, the panels may be folded or rolled up in order to be introduced into the manhole 6 of the reactor 1. Consequently the dimensions of a single panel may be increased, compared to the conventional art, with a reduction in the number of panels needed to form the collector 5, for the same surface area. Assembly is also made easier since the connections between the panels are not load-bearing and it is no longer required to perform high-quality long welds as in the prior art. The invention therefore achieves the objects which have been illustrated above.

The invention claimed is:

1. A reactor for catalytic chemical reactions, comprising:
   a partially open outer vessel comprising a manhole for accessing to the interior, inlet and outlet openings for inlet and outlet, respectively, of reagents and reaction products, and at least one internal wall,
   the partially open vessel having no full-diameter openings, and the only openings and flanges of the vessel being significantly smaller than its diameter,
   wherein:
   the reactor comprises a catalyst cartridge which contains a catalyst bed with radial or axial-radial through-flow, and which comprises a load-bearing external wall;
   said at least one internal wall is a single-wall outer collector of the catalyst bed;
   said catalyst bed being delimited by an inner collector and said single-wall outer collector, which are perforated and gas-permeable;
   wherein said single-wall outer collector comprises a plurality of panels, which are assembled inside the vessel to form said outer collector, the panels being flexible and deformable so as to allow their insertion through said manhole and/or through at least one of said inlet and outlet openings, and the resulting outer collector being non self-supporting and resting on said load-bearing wall of the cartridge, and
   said panels have dimensions greater than said manhole and openings, and
   the panels are introduced in the reactor in elastically deformed condition and recover their original undeformed configuration after introduction into the reactor.

2. The reactor according to claim 1, wherein said panels are shaped with crests or ribs directed parallel to the reactor axis and defining lines of bearing contact of the outer collector against the load-bearing wall.

3. The reactor according to claim 2, wherein the crests or ribs of the panels define a distance between the outer collector and the load-bearing wall of the cartridge, thus defining an interspace for the passage of gas between said wall and said collector.

4. The reactor according to claim 2, the panels being made of fretted metal sheet or corrugated metal sheet.

5. The reactor according to claim 1, wherein each of said panels has at least a surface portion which is gas permeable and a surface portion which is non gas-permeable.

6. The reactor according to claim 1, wherein each panel comprises at least:
   a first surface zone with a first arrangement of gas passages, and
   a second surface zone with a second arrangement of gas passages,
   the first and second arrangements being different in terms of shape and/or size and/or mutual spacing of the gas passages.

7. The reactor according to claim 1, also comprising one or more section-breaker rings fixed to the panels.

8. The reactor according to claim 1, wherein the panels can be introduced into the vessel through said manhole by means of elastic or partially elastic reversible deformation thereof.

9. A method for realizing an internal wall and collector inside a partially open catalytic reactor, said reactor comprising an outer vessel and at least one manhole for accessing the inside of the vessel, the method being characterized in that:
   said internal wall is assembled inside the vessel by means of a plurality of panels,
   the panels are deformed elastically so that they can be introduced inside the reactor through said reactor manhole,
   wherein the panels are introduced in the reactor in elastically deformed condition and recover their original undeformed configuration after introduction into the reactor,
   after being introduced into the reactor, the panels are assembled so as to rest against a load-bearing wall of the reactor, forming a non self-supporting collector,
   wherein:
   said reactor comprises a catalyst cartridge containing a catalyst bed with radial or axial-radial through-flow and comprising a load-bearing external wall;
   said internal wall is formed by an outer collector of the catalyst bed, situated inside the cartridge, and said collector is assembled with the component panels resting against said load-bearing wall of said cartridge.

* * * * *